United States Patent [19]

Netsch

[11] Patent Number: 4,577,568
[45] Date of Patent: Mar. 25, 1986

[54] BRACKET AND TOOTH ASSEMBLY FOR PLANTER

[76] Inventor: Miles Netsch, Rte. 2, Terril, Iowa 51364

[21] Appl. No.: 664,520
[22] Filed: Oct. 25, 1984
[51] Int. Cl.⁴ ............................................. A01C 23/00
[52] U.S. Cl. ...................................... 111/7; 172/253; 172/776; 172/707
[58] Field of Search ............... 172/776, 198, 482, 707, 172/763, 762, 708, 705, 706, 252, 253, 166; 111/1, 7, 52, 73, 85, 86, 87, 65, 66, 71, 79, 80, 83, 84

[56] References Cited

U.S. PATENT DOCUMENTS

| | | | |
|---|---|---|---|
| 2,781,733 | 2/1957 | Graham | 111/7 |
| 3,606,938 | 9/1971 | Quanbeck | 172/705 |
| 3,707,132 | 12/1972 | Hansen | 111/7 |
| 3,799,079 | 3/1974 | Dietrich | 111/7 |
| 3,921,726 | 11/1975 | Connor et al. | 172/707 X |
| 4,127,341 | 11/1978 | Stevens | 172/198 X |
| 4,171,172 | 10/1979 | Johnston | 172/763 X |
| 4,210,210 | 7/1980 | Ankenman | 172/705 X |
| 4,368,783 | 1/1983 | Hake et al. | 172/198 X |
| 4,407,371 | 10/1983 | Hahl | 172/166 X |
| 4,465,369 | 8/1984 | Meinert et al. | 172/707 X |

FOREIGN PATENT DOCUMENTS

| | | | |
|---|---|---|---|
| 1551 | 8/1968 | Australia | 111/7 |
| 696516 | 10/1964 | Canada | 172/705 |

Primary Examiner—Robert A. Hafer
Assistant Examiner—Danton DeMille
Attorney, Agent, or Firm—Herman H. Bains

[57] ABSTRACT

A bracket and tooth assembly for a planter type implement includes a bracket having mounting means adjustably engaging the implement tool bar. The bracket includes an arm which supports the furrowing tooth to position the latter laterally but closely adjacent the planting furrow to permit effective dumping of liquid fertilizer from a conventional dispensing tube carried by the furrowing tooth.

4 Claims, 5 Drawing Figures

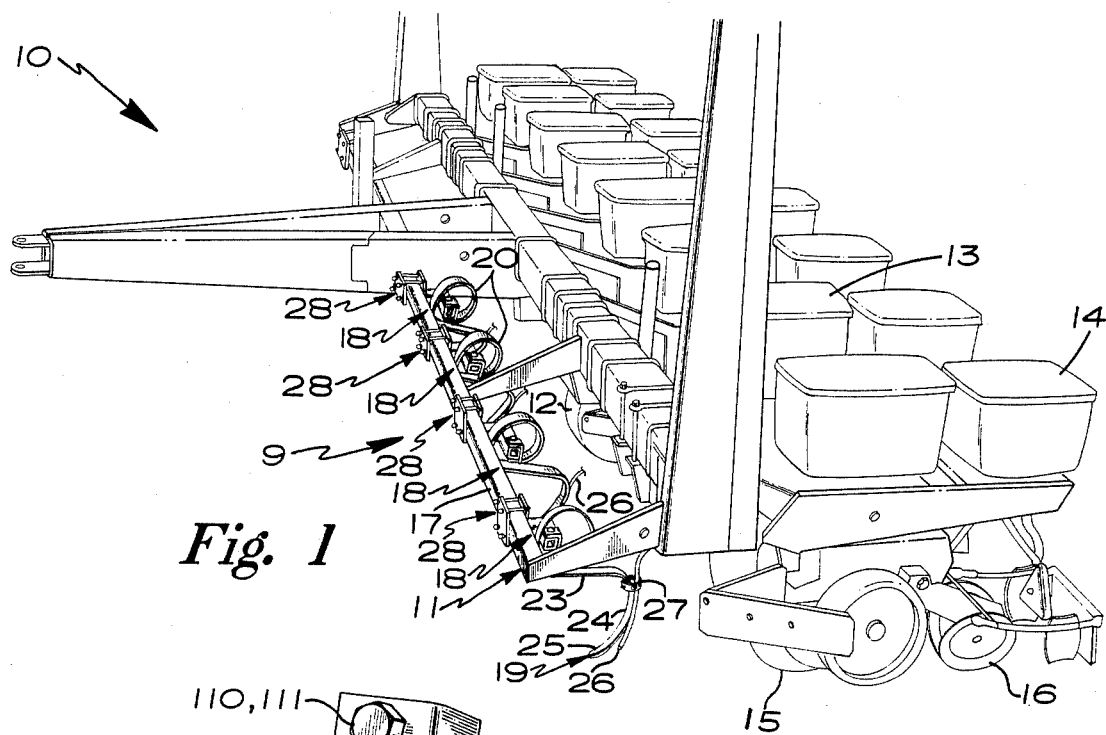
Fig. 1
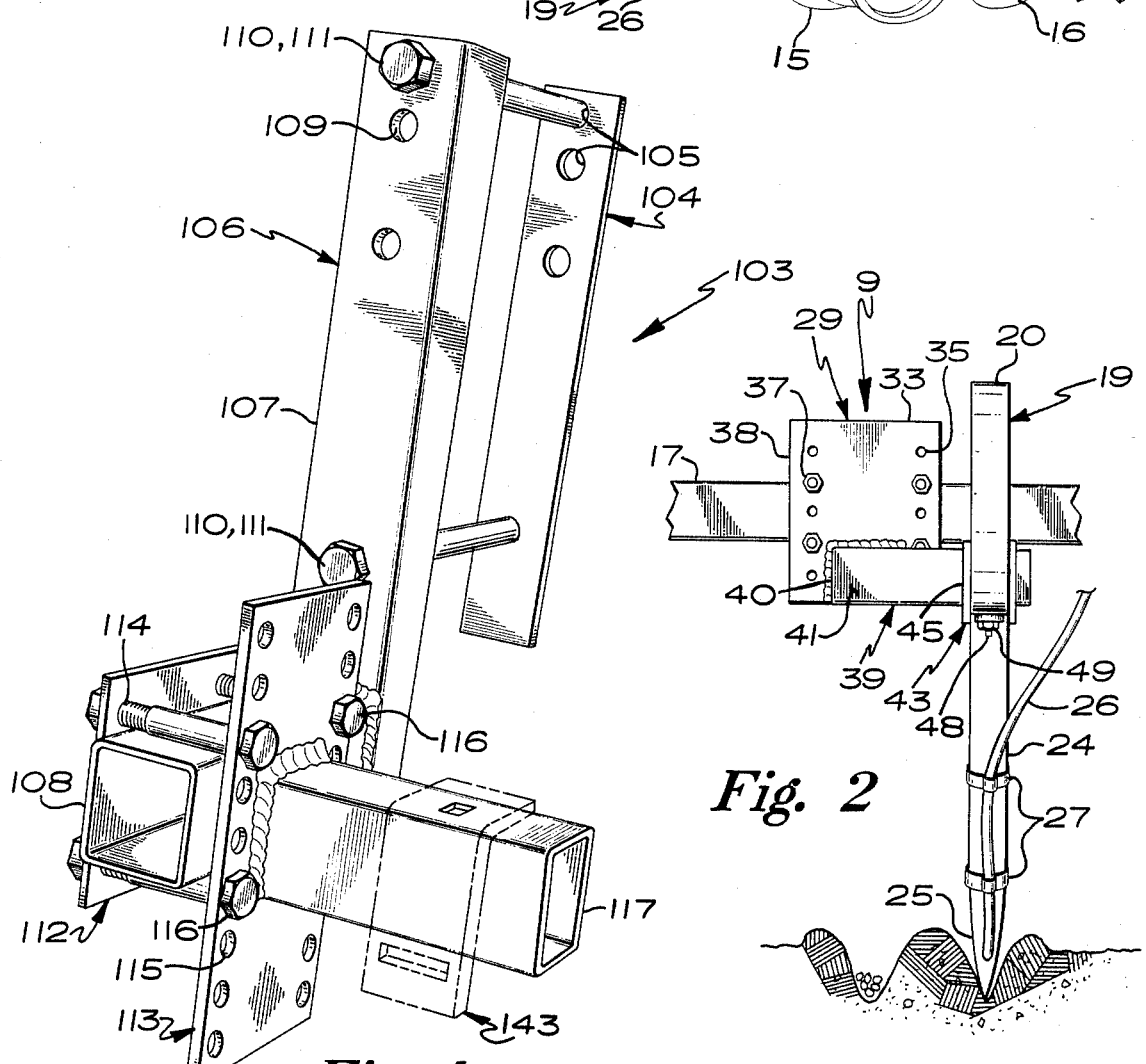
Fig. 2
Fig. 4

BRACKET AND TOOTH ASSEMBLY FOR PLANTER

BACKGROUND OF THE INVENTION

This invention relates to a bracket and tooth assembly for a planting implement.

In commercial planting implements, such as corn planters or the like, a herbicide is typically applied to the furrow at the same time that the seeds are being planted. Liquid fertilizers are also being used more and more by farmers, and are sometimes applied during the planting operation. However, if the liquid fertilizer is applied directly to the seeds, the seeds may be damaged or killed.

It is therefore a general object of this invention to provide a novel bracket and tooth assembly which may be readily mounted on a planter type implement, and which is operable to form a shallow furrow closely adjacent the seed furrow for receiving liquid fertilizer therein.

It is another object of this invention to provide a bracket and tooth assembly for a planter type implement which effectively discharges the liquid fertilizer closely adjacent the seed furrow, but preventing discharge of the fertilizer from the seeds. These and other objects of the invention are more fully described in the following specification.

FIGURES OF THE DRAWING

FIG. 1 is a perspective view of a corn planter implement incorporating the novel bracket and tooth assembly;

FIG. 2 is a rear view of the corn planter implement incorporating the novel bracket and tooth assembly;

FIG. 4 is a perspective view of a modified form of the bracket and tooth assembly.

DESCRIPTION OF THE PREFERRED EMBODIMENT

Figure 5:
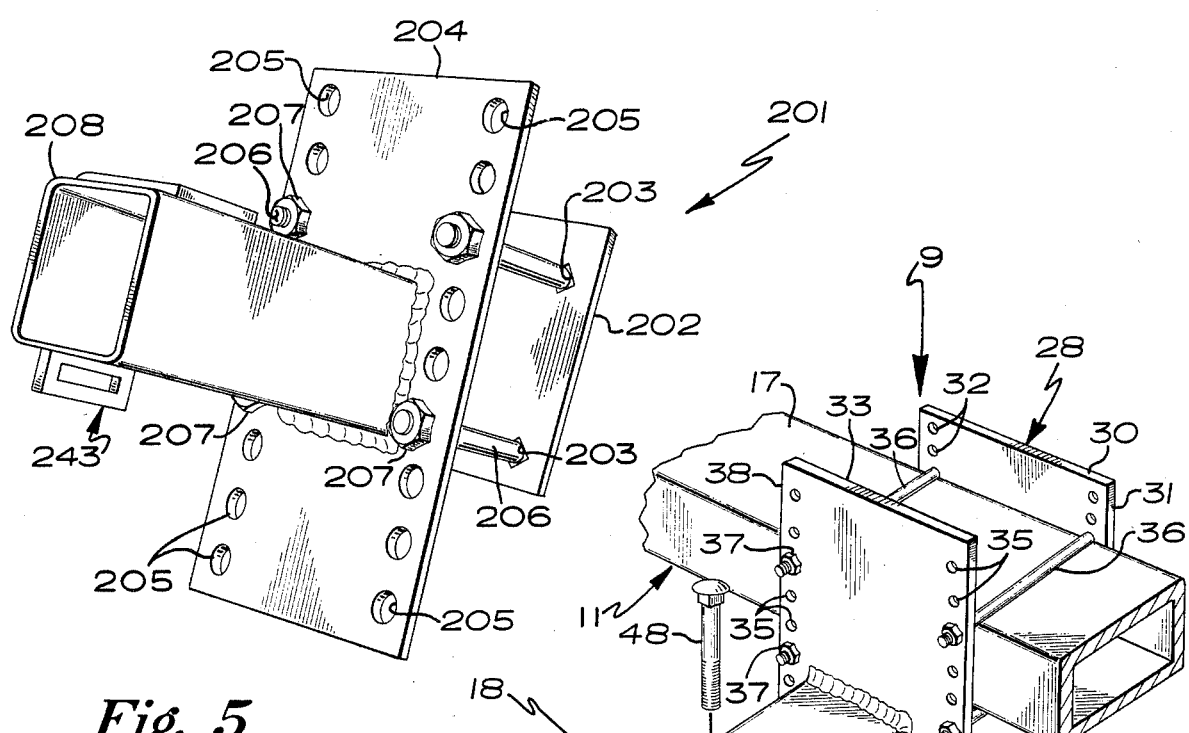
FIG. 5 is a perspective view of a further modification of the bracket and tooth assembly.

Referring now to the drawings and more specifically to FIG. 1, it will be seen that my novel bracket and tooth assembly designated generally by the reference numeral 9 is advantageously incorporated on a conventional commercial planter implement, such as the corn planter 10. It is pointed out that my novel bracket and tooth assembly 9 may be used with any planter implement and that the planter implement 10 is merely illustrative of a planter implement with which the bracket and tooth assembly have been illustrated. The planter implement 10 includes a frame 11 having ground engaging wheels 12 to permit the planting implement to be towed by a tractor or the like. The planter implement 10 is provided with a plurality of planter devices including seed boxes 13 mounted on the frame and arranged in side-by-side relation. Each planter device has a discharge tube through which the seed is discharged. The planter implement 10 may also include a plurality of herbicide receptacles 14 which contain a powdered herbicide and each have an outlet conduit through which the herbicide is discharged. The corn planter includes a plurality of furrowing discs 15 for forming the furrows into which the seeds are discharged. A plurality of closing discs 16 are also provided for closing the furrow in a well-known manner.

Figure 3:
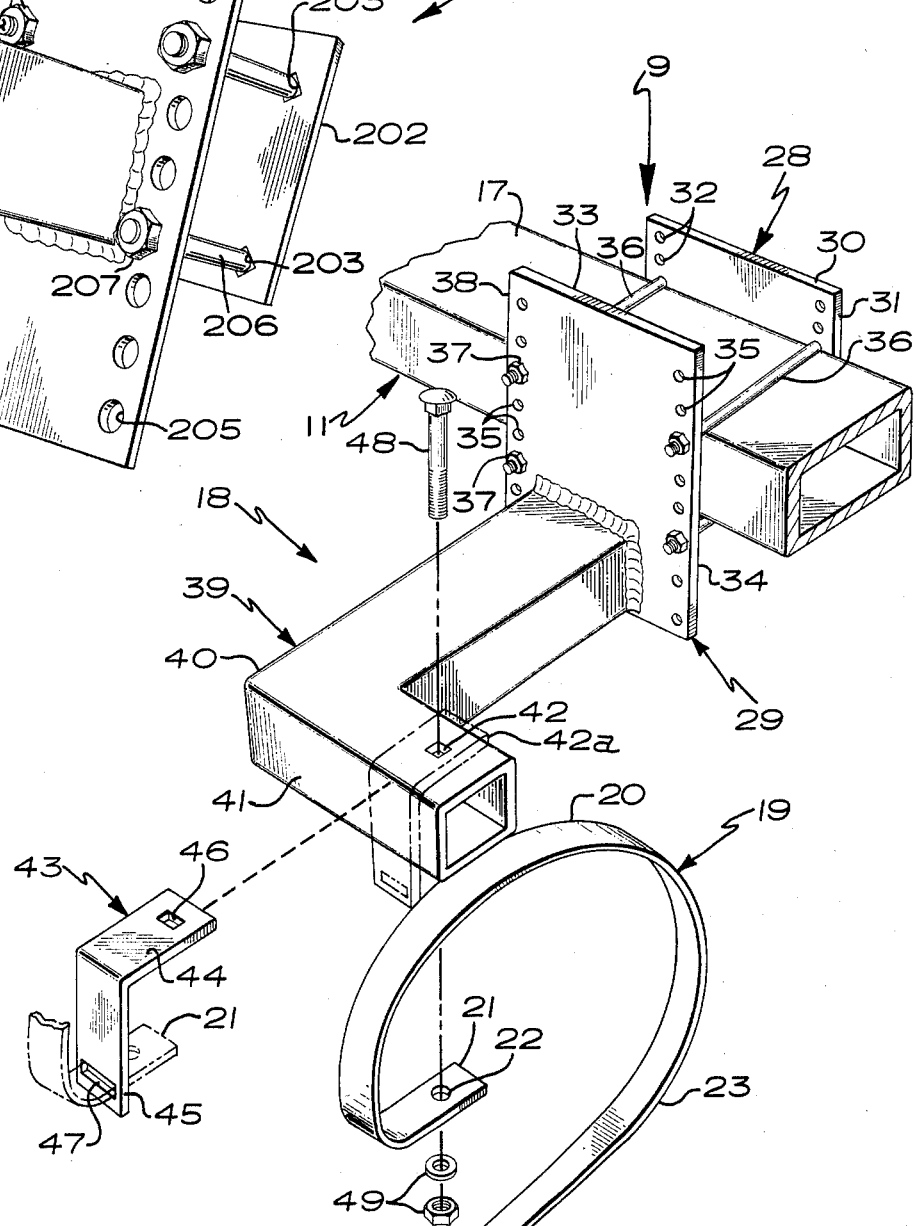
FIG. 3 is a fragmentary exploded perspective view illustrating the novel bracket and tooth assembly mounted on the tool bar of a planter implement.

Referring now to FIG. 3, it will be seen that the novel bracket and tooth assembly 9 is mounted on the transverse frame member 17 of the frame 11 and is positioned forwardly of the planter 13. The bracket and tooth assembly 9 includes a bracket assembly 18 and a Danish-type furrowing tooth 19. The furrowing tooth 19 includes an upper arcuate portion 20 which terminates in a flat attachment tab 21 having an opening 22 therewith. The upper arcuate portion 20 of the tooth 19 is integral with an intermediate portion 23 that extends rearwardly and downwardly therefrom. The intermediate portion 23 is integral with a lower portion 24 that extends downwardly and forwardly therefrom. The lower forward end of the lower portion 24 is provided with a spark shovel 25 which is secured thereto. The furrowing tooth 19 is adapted to form the planting furrow during the planting operation.

In this regard, a fertilizer discharge tube 26 is secured to the rear surface of the lower portion 24 of the furrowing tooth, as best seen in FIG. 2. The upper end portion of the discharge tube 26 is connected to the conduit 16 so that the fertilizer is discharged into the furrow formed by the furrowing tooth.

The bracket device 18 is secured to the furrowing tooth 19 and mounts the latter on the tool bar 17 of the frame 11. The bracket device includes a generally rectangular-shaped front plate 28 and a generally rectangular-shaped rear plate 29. The front plate 28 includes upper and lower straight substantially parallel transverse edges 30 and opposed vertical edges 31. A plurality of openings 32 are formed in the front plate 28 and are arranged in rows, each row being located adjacent one end of the vertical edges 31.

The rear plate 29 also has upper and lower straight substantially parallel transverse edges 33 and opposed vertical edges 34. Rear plate 29 also has a plurality of openings 25 therethrough and has openings also arranged in a pair of rows, each row being located adjacent one of the vertical edges 34. Bolts 36 extend through the openings in the front and rear plates and are secured in place by suitable nuts 37. In this regard, the front plate 28 is positioned against the front surface of the transverse tool bar 17 and the rear plate 29 is clamped against the rear surface thereof.

The rear surface 38 and rear plate 29 has an L-shaped support arm 39 extending outwardly and horizontally therefrom. An L-shaped support arm 39 includes a longitudinally extending arm element 40 which is of rectangular cross-sectional configuration and an arm element 41 which is integral with the arm element 40 and extends at right angles thereto. It will also be noted that the arm element 41 is also a hollow rectangular cross-sectional configuration. The arm element 41 has an opening 42 through the upper wall surface 42a thereof which communicates with the interior of the arm element 41.

The bracket and tooth assembly 9 also includes an L-shaped bracket 43 including a substantially flat horizontal bracket element 44 and a depending bracket element 45 which is integral with the bracket element 44 and extends downwardly at substantially right angles thereto. The horizontal bracket element 44 has an opening 46 therethrough and the depending bracket element 45 has a transverse slide 47 therethrough. The bracket element 43 is positioned so that the horizontal element 42 is positioned against the upper surface 42a of the arm element 41 and the opening 46 and the L-shaped bracket is exposed in registering relation with the opening 42 in the upper surface of the arm element 41. The attachment tab 21 of the furrowing tooth extends through the slot 47 in the depending bracket element 45 and a bolt 48 extends through the opening 22 in the attachment tab and the registering openings in the L-shaped bracket 43 and the arm element 41. A suitable nut and washer 49 secure the bolt 48 in connected relation with the arm element 41.

Referring now to FIG. 2, it will be seen that the shallow furrow made by the tooth 19 is laterally offset with respect to the seed furrow. In the embodiment shown, the furrow made by the tooth 19 is offset approximately one to three inches from the seed furrow. With this arrangement, the liquid fertilizer will be discharged closely adjacent the seed furrow, but will not be discharged directly into the seed furrow. Therefore, there is little, if any, danger of damaging the seeds with the liquid fertilizer. The bracket and tooth assembly 9 may be shifted laterally to move the furrowing tooth 19 towards or away from the seed furrow, depending on the kind and condition of the soil.

Referring now to FIG. 4, it will be seen that a different embodiment of a bracket and tooth assembly, designated generally by the reference numeral 99, is thereshown. The bracket and tooth assembly include a tooth (not shown) and is identical in all respects to the furrowing tooth 19, illustrated in the embodiments of FIGS. 1 and 2. The tooth (not shown) is provided with a fertilizer discharge tube (not shown) and is mounted on the bracket device 103 by an L-shaped bracket 102, which is also identical in construction to the L-shaped bracket 43 in the embodiment illustrated in FIGS. 1 to 3.

The bracket device 103 includes a generally rectangular shaped elongate vertically disposed clamping plate 104 having a plurality of openings 105 therethrough. The bracket device 103 also includes an L-shaped support member 106 including an elongate vertical arm 107 and a shorter horizontal arm 108, which is integral with the vertical arm and projects at substantially right angles thereto. The vertical and horizontal arms 107 are of a rectangular cross-sectional configuration and the vertical arm 107 is provided with spaced apart openings 109 therethrough for accommodating bolts 110 that also project through the openings 105 and the clamping plate 104. It will be noted that the clamping plate 104 is positioned against one vertical surface of the tool bar 17 and the vertical arm 107 of the L-shaped support member 106 is positioned against the other vertical surface. Suitable nuts 111 engage the threaded ends of the bolts 103 to secure the latter in clamped relation with respect to the tool bar.

The bracket device 103 also includes a generally rectangularly shaped clamping plate 112 and a generally rectangular shaped clamping plate 113, which is slightly larger in size than clamping plate 112. Clamping plate 112 has a plurality of openings 114 therethrough and the clamping plate 113 has a plurality of openings 115 therethrough. The clamping plates 112 and 113 are positioned against opposed surfaces of the horizontal arm 108 and are secured thereagainst by suitable bolt and nut units 116. In the embodiment shown, the horizontal arm 108 projects forwardly of the vertical arm 107 and the clamping plates 112 and 113 are disposed in vertical relation with respect to the horizontal arm 108.

The clamping plate 113 has an arm 117 integral therewith and projecting laterally therefrom. The arm 117 is horizontally disposed and is of a generally rectangular cross-sectional configuration. In the embodiment shown, the arm 117 is disposed in parallel relation with respect to the tool bar 17.

The bracket 102 is positioned so that the horizontal arm 102a engages the upper surface of the transverse arm 117 and the vertical bracket element 102b engages the rear surface of the transverse arm 117. The tooth (not shown) projects through the slot 102c of the L-shaped bracket 102, and a nut and bolt assembly extend through an opening in the horizontal bracket element 102a through the opening in the attachment tab of the tooth (not shown). The bolt is secured in place by a suitable nut 119.

Referring now to FIG. 5, it will be seen that a further embodiment of the novel bracket and tooth assembly, designated generally by reference numeral 199, is thereshown. The bracket and tooth assembly include a tooth (not shown) and a bracket device 201. The tooth (not shown) is identical to the tooth 19 illustrated in the embodiments of FIGS. 1 to 3. Thus, the tooth is provided with a fertilizer discharge tube (not shown) which is clamped to the rear surface thereof in the identical manner of the earlier described embodiments.

The bracket device 201 includes a generally rectangular shaped clamping plate 202 having openings 203 therethrough. The bracket device also includes a second rectangular shaped clamping plate 204 having openings 205 therethrough arranged in longitudinal rows adjacent the longitudinal side edges of the clamping plate 204. It will be noted that the clamping plate 204 is substantially larger in size than the clamping plate 202. Suitable bolts 206 extend through the openings 205 in the clamping plate 204 and the openings 203 in the clamping plate 202. Each bolt 206 is provided with a nut 207 to secure the clamping plates in clamped relation on the tool bar 17 of a planter-type implement. In the embodiment shown, the tool bar 17 extends in a fore and aft direction and the clamping plates 202 and 204 engage vertical surfaces of the tool bar and are disposed in vertical relation relative thereto.

The clamping plate 204 is provided with an elongate arm 208 which is rigidly affixed thereto and which projects outwardly therefrom. It will be noted that the arm 208 is a generally rectangular hollow configuration and extends laterally and horizontally relative to the tool bar 17 when the bracket and tooth assembly are mounted on the tool bar. The tooth 200 is mounted on the arm 208 of the bracket device 201 by means of an L-shaped bracket 209 which is identical in construction to the L-shaped brackets used to mount the tooth on the previously described embodiments. In this regard, the bracket 209 is provided with a slot therein through which the attachment tab of the furrowing tooth projects. The horizontal bracket element of the L-shaped bracket 43 engages the upper surface of the arm 208 and a bolt 210 extends through an opening in the horizontal bracket element and through an opening in the attachment tab of the tooth and is secured in place by means of a suitable nut 211.

The bracket and tooth assembly of FIG. 5 function in the same manner as the previously described embodiments.

From the foregoing description, it will be seen that the bracket and tooth assembly permits efficient application of fertilizer in close but safe proximity to the seed furrow during the planting operation.

Thus, it will be seen that I have provided a novel and improved bracket and tooth assembly, which is not only of simple and inexpensive construction, but one which operates in a more efficient manner than any heretofore known comparable device.

What is claimed is:

1. A bracket and tooth assembly for a planter type implement having a horizontal tool bar, comprising:
   a furrowing tooth including an upper arcuate portion terminating in a flat horizontal forwardly extending attachment tab, an intermediate portion integral with said arcuate portion and extending rearwardly and downwardly therefrom, a lower portion integral with said intermediate portion and extending forwardly and downwardly therefrom, a vertically disposed fertilizer tube for dispensing fertilizer therefrom into a furrow formed by the furrowing tool and being secured to the rear surface of the lower portion of the furrowing tool,
   a bracket comprising a pair of substantially flat vertically disposed clamping plates engaging opposed surfaces of the horizontal tool bar of the planter implement, means engaging said clamping plates for releasably clamping the same against the tool bar,
   an elongate arm rigidly affixed to one of said clamping plates extending outwardly therefrom in a direction substantially normal to the tool bar,
   means connecting the attachment tab of the furrowing tooth to said arm comprising an elongate bar having one end thereof affixed to said arm and extending at substantially right angles thereto, said attachment tab being secured to said bar, whereby the position of the furrowing tooth is closely adjacent, but laterally of the seed furrow so that liquid fertilizer will be dispensed into the furrow formed by said furrowing tooth.

2. The invention as defined in claim 1 wherein said clamping plates are vertically adjustable relative to said tool bar.

3. The invention as defined in claim 1 wherein said bar is affixed to the end of said arm.

4. A bracket and tooth assembly for a planter type implement having a horizontal tool bar, comprising:
   a furrowing tooth including an upper arcuate portion terminating in a flat horizontal forwardly extending attachment tab, an intermediate portion integral with said arcuate portion and extending rearwardly and downwardly therefrom, a lower portion integral with said intermediate portion and extending forwardly and downwardly therefrom, a vertically disposed fertilizer tube for dispensing fertilizer therefrom into a furrow formed by the furrowing tool and being secured to the rear surface of the lower portion of the furrowing tool,
   a bracket comprising a pair of substantially straight vertically disposed clamping members engaging opposed surfaces of the horizontal tool bar of the planter implement, means engaging said clamping bars for releasably clamping the same against the tool bar,
   an elongate arm rigidly affixed to one of said clamping members extending outwardly therefrom in a direction substantially normal to the tool bar,
   a pair of clamping plates clamped to said arm,
   an elongate bar affixed to one of said clamping plates,
   means connecting the attachment tab of the furrowing tooth to said arm to position the furrowing tooth closely adjacent, but laterally of the seed furrow so that liquid fertilizer will be dispensed into the furrow formed by said furrowing tooth.

* * * * *